A. K. BALTEZOR.
DRIVING AND STEERING MEANS.
APPLICATION FILED AUG. 10, 1909.

974,625.

Patented Nov. 1, 1910.
4 SHEETS—SHEET 2.

Witnesses
F. T. Mackson
W. N. Roach, Jr.

Inventor
Andrew K. Baltezor
By Geo. S. Vashon
Attorney

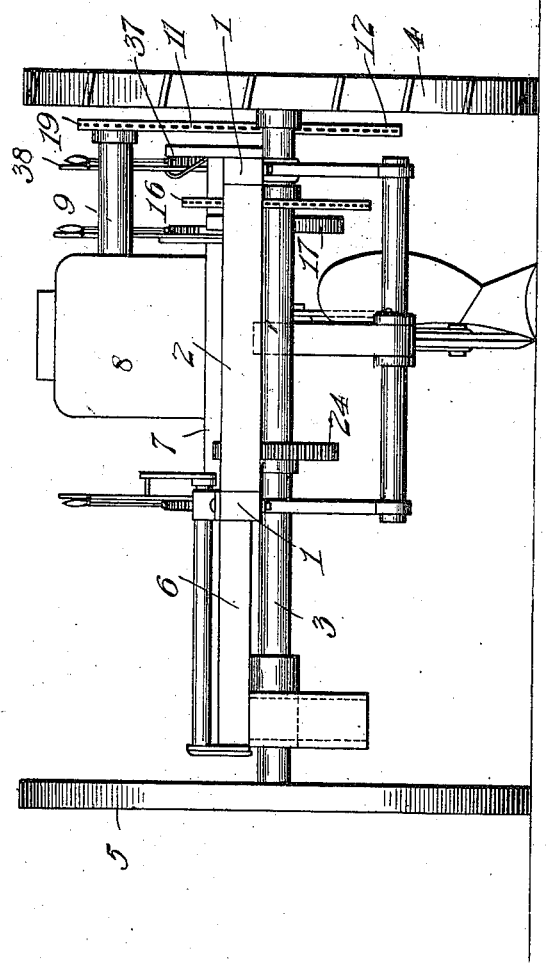

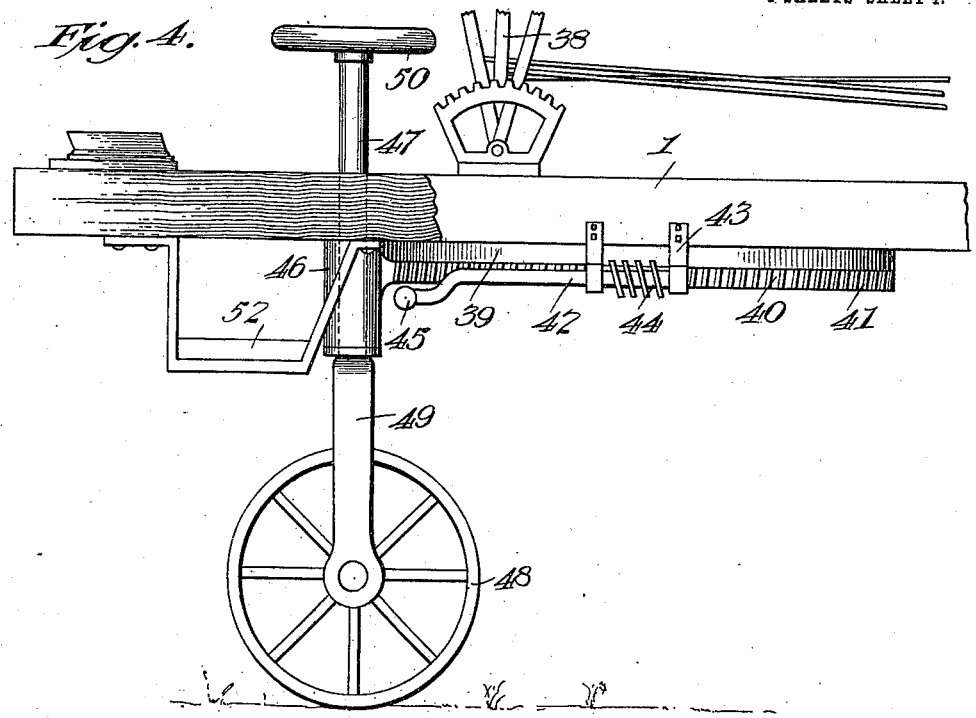

UNITED STATES PATENT OFFICE.

ANDREW K. BALTEZOR, OF WENTZVILLE, MISSOURI.

DRIVING AND STEERING MEANS.

974,625.  Specification of Letters Patent.  Patented Nov. 1, 1910.

Original application filed April 13, 1909, Serial No. 489,585. Divided and this application filed August 10, 1909. Serial No. 512,176.

*To all whom it may concern:*

Be it known that I, ANDREW K. BALTEZOR, a citizen of the United States, residing at Wentzville, in the county of St. Charles and State of Missouri, have invented new and useful Improvements in Driving and Steering Means, of which the following is a specification.

The present invention relates to motor plows, and is a divisional application of copending application, Serial No. 489,585, filed April 13, 1909.

The object of the present divisional invention is to provide driving and steering means for the plow structure, which is simple and effective, will permit the plow to be moved in opposite directions, and will also permit short or sharp turns to be made whenever desired.

The preferred embodiment of the invention is illustrated in the accompanying drawings, wherein:—

Figure 1:
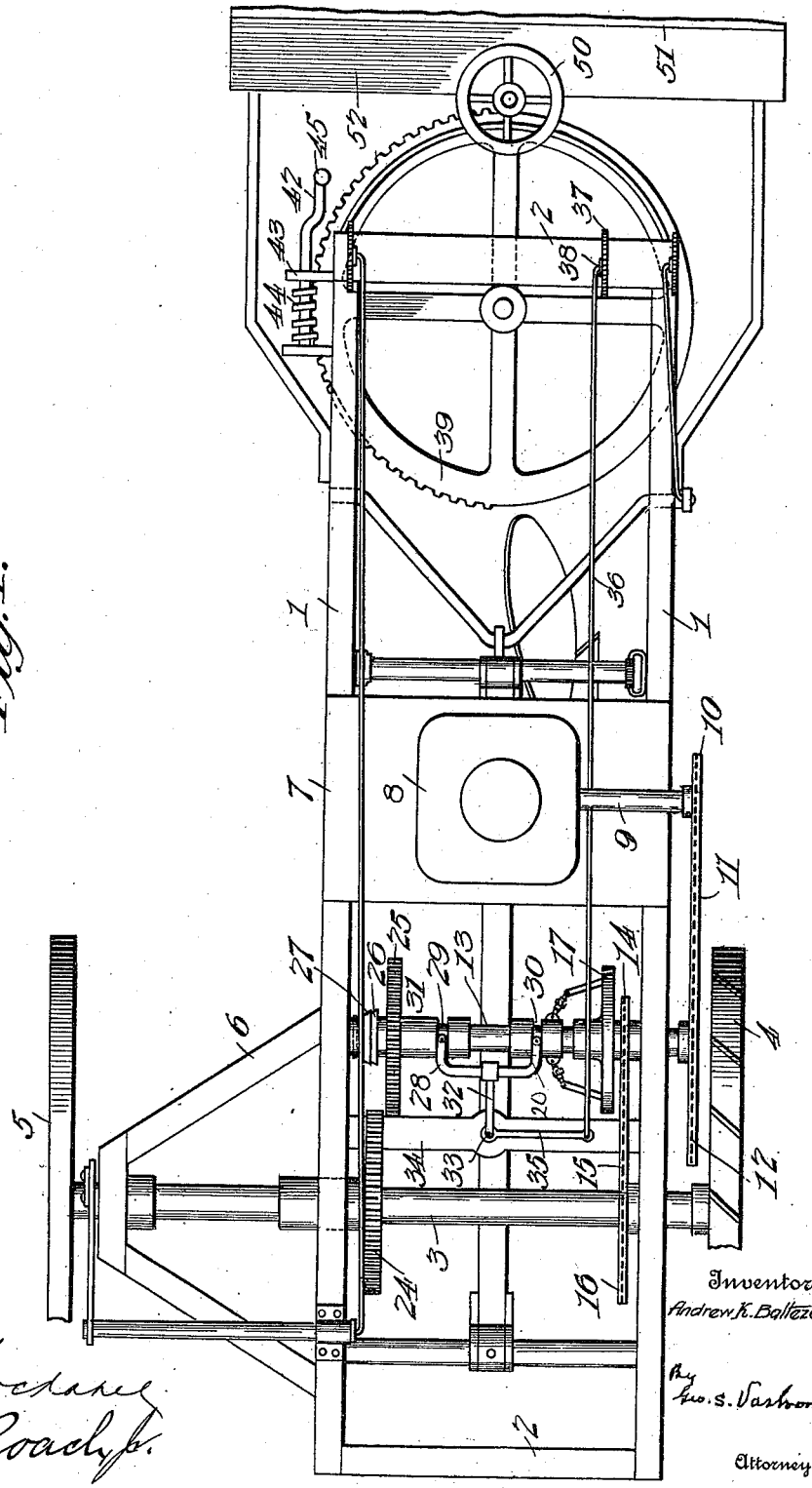
Figure 2:
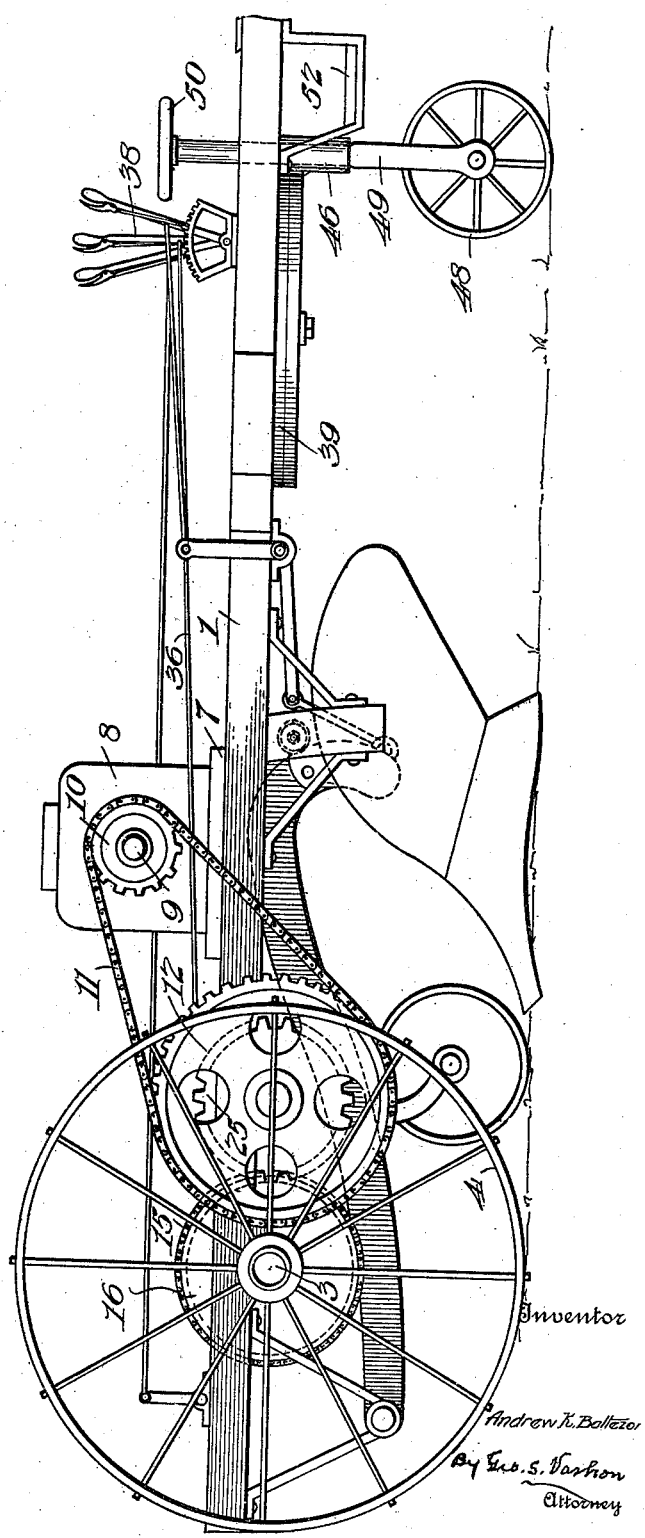

Figure 1 is a top plan view of the same. Fig. 2 is a side elevation thereof. Fig. 3 is a front elevation. Fig. 4 is a side elevation on an enlarged scale of the rear portion of the structure.

Similar reference numerals designate corresponding parts in all the figures of the drawings.

In the embodiment disclosed, a suitable supporting frame is employed comprising longitudinal side beams 1, which are connected by transverse end beams 2. Journaled on the front portion of the frame, thus provided, is a rotatable driving axle 3, to one end of which is fixed a supporting and traction wheel 4. Another supporting wheel 5 is loosely mounted at the other end of said axle, which axle projects beyond the opposite side of the frame to the traction wheel 4, and is suitably supported in a bracket 6.

A motor bed 7 is suitably mounted on the frame, and supports a motor 8, which may be of any well known character, but is preferably of the explosive engine type. This motor has a shaft 9 projecting from one side of the same, which carries a sprocket wheel 10 around which passes a sprocket chain 11. The chain also passes around another sprocket wheel 12, preferably of greater diameter than the wheel 10, and carried by one end of a countershaft 13 journaled on the frame in rear of and parallel to the axle 3. Rotatably mounted on the countershaft 13 is a sprocket wheel 14 connected by a sprocket chain 15 with another sprocket wheel 16 that is fast upon the axle 3. The sprocket wheel 14 carries the friction band or flange 17 of a lever clutch, the structure of which is the subject-matter of co-pending application, Serial No. 543,663 filed Feb. 14, 1910.

The above described mechanism is for driving the machine forwardly. A reverse drive is also provided. To this end, a gear wheel 24 is employed that is fixed to the axle 3, and another gear wheel 25, slidable upon the countershaft 13, is movable into and out of mesh with the gear 24. The wheel 25 is also preferably rotatable on the shaft 13, but when it moves into mesh with the gear wheel 24, a friction cone 26, carried by it, moves into frictional engagement with a receiving member 27 mounted on and fixed to the countershaft 13. The gear 25 and the clutch are simultaneously operated, and to this end, a yoke 28 is employed, the arms of which are bifurcated, as shown at 29, and engaged in annular grooves 30 formed in the collar 20, and the hub 31 of the gear wheel 25. The yoke is moved longitudinally of the countershaft 13 by means of a crank arm 32 connected thereto, which crank arm forms part of an upright shaft 33 journaled in a cross bar 34 of the frame. This shaft is provided with an outstanding arm 35 to which is connected a link 36, and said link extends to the rear portion of the frame, and is connected to a lever 38 provided with a suitable holding dog coöperating with a rack 37. By operating this lever, it will be obvious that either the driving or reverse gears may be thrown into operation, and when either is so moved, the other will be thrown out of coaction. Moreover the parts may be disposed in an intermediate position, in which case, the motor can be operated without effecting the operation of the machine, and said motor can then be employed for driving any other machinery desired.

For the purpose of supporting the rear end of the machine, and steering the same, the following mechanism is preferably employed. A fifth wheel 39 is carried by the rear end of said frame, and journaled beneath the same concentrically thereto, is a steering wheel carrier 40, a portion of the periphery of which has worm teeth 41. A shaft 42, journaled in bearings 43 secured to the frame, has a worm 44 that meshes with the worm teeth, and said shaft is also provided with an actuating handle 45. The rotatable carrier furthermore has a vertical sleeve 46 disposed at one side of its axis of rotation, and journaled in this sleeve is the upstanding stem 47 of a supporting and steering wheel 48, rotatably mounted in a yoke 49 formed upon the lower end of the stem. The upper end of this stem has a suitable hand wheel 50. A seat 51 is disposed adjacent to the hand wheel 50, and a foot support 52 is suspended from the frame in advance of the seat.

In so far as the frame adjusting and plow supporting and adjusting means is concerned, no description thereof is herein made, inasmuch as these features constitute the subject-matter of the above noted copending application, of which the present application is a division.

In the operation of the structure, the motor will of course drive the countershaft 13 through the gearing with which it is connected, and if the clutch operating means is in a neutral position, the shaft 13 will rotate without effecting the operation of any of the parts. If, however, the lever 37 is moved to effect the operation of the clutch, the countershaft will be connected to the axle 3, which will be rotated and the machine propelled forwardly. If on the other hand, the lever is moved in an opposite direction, the gear 25 will be brought into mesh with the gear 24, and after such meshing action takes place, the clutch members 26 and 27 will be brought into coöperative engagement. The movement of the apparatus will consequently be in a reverse direction. For ordinary steering the turning of the hand wheel 50 will be sufficient, inasmuch as this will turn the steering wheel 48 on a vertical axis, but it sometimes happens that short or sharp turns are necessary, in which case the operator has only to revolve the shaft 42, thereby rotating the worm 44, and the steering wheel carrier effecting the change of the mounting and a rapid turning movement.

From the foregoing it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a motor plow structure, the combination with a supporting frame, of a horizontal steering wheel carrier rotatably mounted thereon on a vertical axis, means for rotating said carrier, a steering wheel rotatably mounted on the carrier on a vertical axis eccentrically placed with relation to the carrier, and means for independently rotating the steering wheel on its axis.

2. In a motor plow structure, the combination with a supporting frame, of a steering wheel carrier rotatably mounted thereon and having worm teeth, a worm engaging the teeth for rotating the carrier, a steering wheel having a stem journaled on the carrier at one side of its axis of rotation, and means for rotating the stem.

In testimony whereof, I affix my signature in presence of two witnesses.

ANDREW K. BALTEZOR.

Witnesses:
L. N. MARSH,
W. R. DALTON.